United States Patent [19]

Levy

[11] Patent Number: 5,401,416
[45] Date of Patent: * Mar. 28, 1995

[54] WATER FILTRATION METHOD

[76] Inventor: Ehud Levy, 1000 Cobb Place Blvd., NW., Bldg. 370, Kennesaw, Ga. 30144

[*] Notice: The portion of the term of this patent subsequent to Jul. 28, 2009 has been disclaimed.

[21] Appl. No.: 918,695

[22] Filed: Jul. 27, 1992

Related U.S. Application Data

[63] Continuation-in-part of Ser. No. 537,078, Jun. 12, 1990, Pat. No. 5,133,871.

[51] Int. Cl.$^6$ .............................. C02F 1/28; C02F 1/70
[52] U.S. Cl. .................................... 210/668; 210/688; 210/757; 210/912
[58] Field of Search ............... 210/663, 669, 688, 757, 210/902, 912, 668, 758

[56] References Cited

U.S. PATENT DOCUMENTS

| | | | |
|---|---|---|---|
| 3,998,731 | 12/1976 | Franzen et al. | 210/670 |
| 4,289,530 | 9/1981 | Rich | 210/688 |
| 4,642,192 | 2/1987 | Heskett | 210/757 |
| 4,994,191 | 2/1991 | Kuznicki et al. | 210/688 |
| 5,133,871 | 7/1992 | Levy | 210/688 |

*Primary Examiner*—Ivars Cintins
*Attorney, Agent, or Firm*—Penrose Lucas Albright; James W. Pravel

[57] ABSTRACT

A drinking water filter for removing lead at point-of-use composed of specially treated gamma alumina particles between 48 and 100 mesh (0.148-0.297 mm), gamma alumina neutral (about 7 surface pH) or basic (about 9 surface pH) is washed in highly purified $H_2O$ at 100° C. to reduce alumima surface pH to 3.5-5.0 and then washed with highly purified $H_2O$ at ambient temperature. The alumina is placed for three to twelve hours in bath having equivalent pH value (3.5-5.0) of acid electrolyte, diluted with a highly purified $H_2O$, preferably HCl, ascorbic acid or EDTA, adjusted to alumina surface pH level and desired degree of dilution by salts such as NaCl and/or alkalies such as NaOH to transfer to adsorbent surface materials that effect selective ion exchange with lead and other heavy metal ions or otherwise cause their removal from drinking water. Upon removal of alumina from bath, it is vacuum washed and then dried in an oven at 200° C. to 350° C. for about two hours. For wet packing in cartridges about 50%, and for dry packing about 98% of moisture is so removed Cartridges contain about 200 grams alumina for each one-half gallon capacity flow per minute, the treated alumina being tightly packed in the cartridges to prevent channeling while not causing a pressure drop at maximum rated capacity of more than about 10 psi across the cartridge. The filter is placed after a further filter using shavings of a zinc-copper alloy to remove chlorine and nitrates, the alumina filter removing zinc, copper, and other heavy metals leached from the zinc-copper alloy media.

8 Claims, No Drawings

WATER FILTRATION METHOD

This is a Continuation-In-Part of application Ser. No. 07/537,078, filed Jun. 12, 1990, which issued as U.S. Pat. No. 5,133,871, on Jul. 28, 1992.

FIELD OF THE INVENTION

The invention relates to a filter for the removal of lead and other heavy metals from drinking water at its point-of-use and the method of manufacturing the filtration media and units. More particularly, the invention is directed to the use of a specially treated alumina for the removal of lead and other heavy metals from drinking water and to the preparation and packaging of the alumina into filters to maximize the removal of lead and other heavy metals dissolved in the metal rapidly and efficiently. A filter in accordance with the invention may be advantageously combined with a filter with a zinc-copper alloy-filtration media to remove chlorine from the drinking water.

BACKGROUND OF THE INVENTION

Low levels of lead, previously considered safe, have been found to cause high blood pressure and strokes in adults and to adversely affect the development, mental abilities and hearing of children. Most of the lead in water that is consumed originates from corrosion in water-delivery systems and home plumbing. Drinking water delivered from municipal and other water suppliers is not normally high in lead content. Thus, the primary source of lead is derived from subsequent corrosion of service connections, pipes, fixtures and other plumbing parts of systems which distribute water tom end consumers. Much of this lead-bearing plumbing is privately owned, that is, it is installed permanently within homes and buildings. Because of this, as a practical matter, the reduction of lead in drinking water has been accomplished primarily by introducing corrosion inhibitors into the drinking water, by adjusting the alkalinity level of the water by raising its pH value to eight, by service connection replacements of water distribution systems to homes or buildings, and by public education concerning the danger of lead in drinking water. Substantial levels of lead have also been found in water delivered to drinking fountains such as those installed in office buildings, schools and other public facilities.

The replacement of plumbing in a home or other building is seldom a practical solution to achieve the desired reduction of lead and other heavy metals in drinking water at point-of-use.

Purification of water at point-of-use is a more logical solution to the problem. Conventional technologies which can be used for this purpose include reverse osmosis, distillation, and filtration utilizing activated carbon and ion-exchange resins. Reverse osmosis and activated carbon filtration units have been widely employed for home drinking water treatment to remove a variety of contaminants, primarily organics from drinking water. These filtration units can also remove lead. Further, distillation and ion-exchange resin units are also effective in removing lead from drinking water. These technologies, however, are non-specific in that they are not directed primarily to the removal of lead and other heavy metals, and for this reason their lead-removal capacities for drinking water are significantly less than might otherwise be the case. The situation is aggravated if alkalinity of the water is increased or corrosion inhibitors are added, which are frequent methods utilized by water treatment plants to reduce the corrosivity of their treated water. Current systems of reverse osmosis do not work well using line pressures which exist in most homes. In addition, their capacities to produce purified water are relatively low. A high pressure pump needs to be added which may prove expensive and impractical. Single-stage distillation units are quite energy intensive and, for this reason, generally should be avoided. Thus, most known technologies for reducing lead and other heavy metals in drinking water at point-of-use are either capital intensive or costly to operate, or both.

The use of alumina for water filters is known. In addition, gamma alumina is known to be selective for heavy metals. Unfortunately, the prior art experience with alumina has not demonstrated that this filtration substance to be a satisfactory solution for point-of-use filtration of drinking water at most locations from the standpoints of efficiency and capacity.

It is often desirable to remove chlorines and chloramines from the water in addition to heavy metals. A method for treating water to remove undesirable constituents contained therein, such as chlorine and nitrate constitutes, is disclosed in U.S. Pat. No. 4,642,192, to D. Heskett, of Feb. 10, 1987. This discloses a method which utilizes a filter consisting of metal particles of a metal alloy composed of copper and zinc, or, in other words, a brass alloy. But the brass alloy leaches copper and zinc into the water that has passed through it. Moreover, brass alloys frequently contain lead, which will also leach from such filters. With a filter of the type taught by the foregoing Patent to Heskett, the water filtered therethrough had 1.2 ppm of copper and 3.6 ppm of zinc. The latter may be in the form of zinc chlorides which contaminate not only of the water, per se, but also may be suspended in vapor and the surrounding air when one takes a shower with water that has been so filtered. Without a filter of this type, chlorine is likely to be present in the household water, which can adversely affect beverages and food that utilize the water for their preparations. Moreover, it has been found that chlorine ingestion, at least in animal studies, alters the body's handling of cholesterol and fats. Accordingly, there is a need not only to reduce or eliminate the chlorine in drinking water or water received at point-of-use, but also wherein filters are provided to eliminate or substantially reduce the chlorine content in water further to eliminate or substantially reduce metals such as zinc and copper, in addition to lead, which may be leached therefrom.

The following is a list of literature and other publications which reflect the skill of the art and, for such purposes, are incorporated herein by reference:

1. Lippens, B. C. and Steggerda, J. J. (1970) Active Alumina. In *Physical and Chemical Aspects of Adsorbents and Catalysts* (B. G. Linsen, Ed.). Academic Press, New York, N.Y.
2. Srivastave, S. K. et al. (1988) Studies on the Removal of Some Toxic Metal Ions from Aqueous Solutions and Industrial Waste. Part I (Removal of Lead and Cadmium by Hydrous Iron and Aluminum Oxide). *Environ. Tech. Letters* 9, 1173–1185.
3. Hohl, H. and Stumm, W. (1976) Interaction of $Pb^{2+}$ with Hydrous-$Al_2O_3$. *J. Colloid Interface Sci.* 55, 281–288.
4. Huang, C. P. et al. (1986) Chemical Interactions Between Heavy Metal Ions and Hydrons Solids. In

*Metal Spectation, Separation, and Recovery* (J. W. Patterson and R. Passino, Eds.). Lewis Scientific Publishing, Comp., New York, N.Y.
5. Bilinski, H. et al. (1975) Copper and Lead in Natural Water. *Vom Wasser* 43, 107–116.
6. Murray, J. and Brewer, P. G. (1977) Mechanisms of Removal of Manganese, Iron and Other Trace Metals from Sea Water. In *Marine Manganese Deposits* (G. P. Glasby, Ed.) Elsevier Scientific Publishing Company, New York, N.Y.
7. Grahame, D. G. (1955) Electrical Double Layer. *J. Chem. Physic.* 23, 1166–1176.
8. Levine, S. and Smith, A. L. (1971) Theory of Differential Capacity of the Oxide-Aqueous Electrolyte Interface. *Dis. Fara. Soc.* 52, 290–301.
9. Matijevic, E. et al. (1960) Detection of Metal Ion Hydrolysis by Coagulation: II. Thorium. *J. Phy. Chem.* 64, 1157–1161.
10. Matijevic, E. et al. (1966) Stabilization of Lyophobic Colloids by hydrolyzed Metal Ions. *Faraday Soc.* 42, 187–196.
11. James, R. O. and Healy, T. W. (1972) Adsorption of Hydrolyzable Metal Ions at the Oxide-Water Interface. Parts I, II and III. *J. Colloid & Interface Sci.* 40, 42–81.
12. Stanton, J. and Maatman, R. W. (1963) The Reaction Between Aqueous Uranyl Ion and the Surface of Silica Gel. *J. Colloid Sci.* 18, 132–146.
13. Dugger, D. L. et al. (1964) The Exchange of Twenty Metal Ions with the Weakly Acidic Silanol Group of Silica Gel. *J. Phys. Chem.* 68, 757–760.
14. Huang, C. P. and Stumm, W. (1973) Specific Adsorption of Cations on Hydrous-$Al_2O_3$. *J. Colloid & Interface Sci.* 43, 409–420.
15. Stumm, W. et al. (1970) Specific Chemical Interaction Affecting the Stability of Dispersed Systems. *Croatica Chem. Act* 42, 223–228.
16. Baes, C. F. and Mesmer, R. E. (1976) *The Hydrolysis of Cations.* John Wiley & Sons, Inc., New York, N.Y.
17. Farley, K. J. et al. (1985) A Surface Precipitation Model for the Sorption of Cations on Metal Oxides. *J. Colloid & Interface Sci.* 106, 226–242.
18. Elliott, H. A. and Huang, C. P. (1984) Factors Affecting the Adsorption of Complexed Heavy Metals on Hydrous—$Al_2O_3$. *Wat. Sci. Tech.* 17, 1017–1028.
19. Kummert, R. and Stumm, W. (1980) The Surface Complexation of Organic Acids on Hydrous-$Al_2O_3$. *J. Colloid & Interface Sci.* 75, 373–385.
20. Kim, J. S. (1988) Characteristics of Humic Substances and Their Removal Behaviour in Water Treatment. Ph.D. Dissertation, Georgia Institute of Technology, Atlanta, Ga.
21. Chian, E. S. K. et al. (1987) Comparison of High Molecular Weigh Organic Compounds Isolated from Drinking Water in Five Cities. In *Organic Pollutants in Water,* Advances in Chemistry Series 214, American Chemical Society, Washington, D.C.
22. APHA-AWWA-WPCF (1985) *Standard Methods for the Examination of Water and Wastewater,* 16th edition. American Public Health Association, Washington, D.C.
23. The Environmental Chemistry of Aluminum, (1989) CRC Press, Inc. Boca Raton, Fla.
24. Principles of Electroplating and Electroforming, W. Blum and G. Hogaboom, 1st Ed., Chapter XVII, McGraw-Hill Book Company, Inc., New York, N.Y.

SUMMARY OF THE INVENTION

Pure alumina is commercially prepared by various processes. In one, the bauxite is treated under pressure with a hot solution of caustic soda to form sodium aluminate and goes into solution while the impurities remain behind as the residue known as "red mud." Pure aluminum trihydrate is precipitated from the solution by heating and cooling.

The hydrated aluminum oxide occurs in a variety of forms, such as the trihydrate ($Al_2O_3 \cdot 3H_2O$ or $Ai(OH)_3$) and monohydrate. Common forms of the aluminum trihydrate are gibbsite, bayerite and nordstandite. Common forms of the aluminum monohydrate are diaspore and boehmite. The structure and morphology of the raw materials that occur as aluminum hydroxides, are of particular importance for determining the physical characteristics of the resulting aluminas, including their specific adsorption properties. This relates to both the alumina's physical structure and its purity inasmuch as the raw materials may contain impurities, such as alkali oxide, iron oxide and sulfates.

If the trihydrate is heated to a temperature that does not exceed 600° C. what is known as a low-temperature alumina is produced, $Al_2O_3 \cdot nH_2O$, wherein $0 < n < 0.6$. Gamma aluminas which are almost entirely anhydrous $Al_2O_3$ are obtained by heating the trihydrates to temperatures of between 900° C. and 1100° C. Upon dehydration of the aluminum hydroxides at increasing temperatures, two neighboring —OH combined to produce $H_2O$ and provide an oxygen ion on the adsorbent surface which is described as a strained oxygen bridge.

At low temperatures, wherein up to one-third of the alumina adsorbent surface is covered with —OH ions, adjacent —OH ions are randomly removed without disturbing the local order otherwise. However, the oxygen ions on the surface are isolated in the sense that none of the oxide ions is on a site adjacent to another oxide ion. Upon further hydration by heating, a vacancy disorder occurs and the remaining —OH ions now have from zero to four oxide neighbors. At still higher temperatures, a migration of surface ions takes place and there is a gradual loss of surface area. The disposition of the —OH ions are also affected by reagents which may be used during the dehydration process.

By providing the proper physio-chemical properties of aluminas in terms of crystallinity, pore size-and texture and the chemical nature of the adsorbent surface, which depends on thermal-chemical dehydration processes and the selected raw material, considering its trace impurities and optimum ratio of surface oxide-hydroxide ions, an alumina filtration material can be produced which has an increased selectivity for the adsorption of soluble lead and lead compounds.

High purity alumina is commercially available in beta and gamma forms. For each of these forms it is available in accordance with its pH value as neutral or basic or a mixture of neutral and basic. Depending upon the raw material, the neutral gamma alumina will have a pH of around 7, including somewhat less than 7 and thus be acidic. The surface pH of the basic gamma alumina is about 9. For the purpose of the instant invention, the gamma forms are preferred, having pH ranges, as described above, in the neutral or basic ranges. Particular attention must be paid to the crystalline characteristics of the alumina as received. The structure and morphology of the alumina are most important. This includes the crystalline structure, pore texture and the chemical characteristics of the adsorbent surface. Generally, the crystalline structure and pore texture should be such as to maximize the adsorption qualities of the alumina. Subsequent heat treatment for thermal dehydration and activation of the alumina is to be avoided in the method in accordance with the invention because it has been found to desensitize the alumina surface for the selective filtration of lead and other heavy metals.

Another quality of the alumina which has been found to contribute substantially to its overall performance in the adsorption of lead from drinking water is its particle size, which should be from 48 to 100 mesh and preferably 60 to 80 mesh. If the mesh size is larger, channelling is more likely to occur. If smaller, it requires undue pressure for water to traverse the filter media.

Another important aspect of the invention is the effective removal of impurities from the alumina such as alkali oxide, iron oxides and sulfates, as well as other minerals, the presence of which can adversely affect the specific adsorptive properties of the alumina. The method of the invention includes the washing of same with deionized and distilled water, and treatment of the media with highly diluted water with a halogen, preferably a chloride or electrolyte solution. In particular, the water used for these purposes should be lead free, preferably to the extent that less than one microgram per liter, or one part per billion, of lead remains in the water after filtration. Water filtered first by reverse osmosis and then in accordance with the invention has been used with satisfactory results and all water used in the inventive method was first so processed.

In the method in accordance with the invention, the aluminum oxide, type basic and/or neutral, size 48–100 mesh, is first washed with the highly purified water at or about 100° C. to reduce the alumina's alkalinity to a low pH surface level of about 3.5 to 5.0, preferably nearer to 3.5. When the alkalinity has been reduced to this level, the alumina is further washed for at least several minutes with the highly purified water. The alumina is then treated by retention in a water tank at ambient temperature, wherein hydrochloric acid or other electrolyte solution diluted by about a 1 in 100 ratio wherein the alumina is retained in the diluted halogen electrolyte solution bath for approximately three to twelve hours. The washing process is completed by a vacuum wash with the highly purified water.

Other solutions which have been used successfully with the invention include ascorbic acid, which is mixed with the salt, NaCl and has its pH value adjusted from 1 to about 5 by the addition of NaOH. Another acid which can be used is EDTA, that is ethylenedianianetetraacetic acid. Various other solutions known to react with lead as an electrolyte may be used, particularly those which include a halogen such as chlorine as a constituent.

The vacuum washing process is accomplished by placing the media on a screen which may be stainless steel or polypropylene and subjecting it to a substantial vacuum for removal of the water. The vacuum pump has a capacity of 300 cubic feet per minute.

Next, the alumina is dried in an oven at temperatures of 200° C. to not exceeding 350° C., for approximately two hours until a desired portion of the water has been expelled from the alumina.

For a subsequent wet packing of the filtration cartridges, approximately 50% of the water is removed. For dry packing, approximately 98% or more of the water is removed by this method.

Finally, the alumina, so treated, is tightly packed either by a wet pack or for dry alumina by vibration to prevent channelling and placed in containers known as cartridges to be used in the water systems at point-of-use.

The filtration media in the cartridges, as packed, may be considered as a chromatographic column in the sense that it adsorbs selected media as it passes through the cartridge. An equivalent packed column can be made by utilizing 100–300 mesh alumina particles which are interconnected by polyethylene bonding so that each particle is exposed to liquid traversing the cartridge and, at the same time, the pressure across the cartridge at maximum flow rate is not more than about 10 pounds per square inch.

Alumina filters prepared in accordance with the invention are extremely selective to lead and other heavy metals, and performance is not adversely affected by anions present in drinking water, such as calcium, magnesium, nitrates and other chemicals. The invention works well at all pH levels normal to drinking water. Filters are generally designed for one year of use with flow rates up to three gallons per minute. However, flow rates of the filters are essentially limited only by the size and weight which can be tolerated in the system at point-of-use and successful filters have been tested having a flow rate of ten gallons per minute, such filters having been prepared in accordance with the invention. The alumina media in the filtration unit is capable of removing dissolved lead in drinking water from approximately 350 parts per billion to 1 part per billion, at normal flow rates and without an undue reduction in the effective pressure at the point-of-use. The highest concentration of lead in drinking water occurs in the first draw of water, usually in the morning within the first two minutes of the draw. Filtration units prepared in accordance with the invention quickly and efficiently remove approximately 99% of the lead that occurs at this time and subsequently, from the water which flows at point-of-use.

The alumina filter can also be utilized advantageously with brass shavings in compositions as disclosed in U.S. Pat. No. 4,642,192, to D. Heskett, of Feb. 10, 1987. A filter of this type can be effective for removing undesirable constituents from household water, such as chlorine and nitrates. However, the material also leaches into the water copper, zinc, and if lead and iron are present in the brass alloy used for the filtration agent, they will also be leached into the water. A filter of this type should be installed in the water flow prior to the alumina filter in accordance with the invention. The brass shavings are packed within the same or another cartridge. The brass alloy used in the instant invention preferably has a higher than normal zinc content for brass alloys (preferably 50% zinc and 50% copper). It has been found that copper and zinc leached therefrom into the water is effectively removed by the alumina filter, whereupon they are at levels of 0.001 ppm or less in the water discharged from the alumina filter. The alloy ratio of 50% zinc, 50% copper, is not critical. If relative amounts of the brass filtration agent is increased, the ratio of the zinc can be less, as found in most commercial brass alloys. However, a higher than usual zinc content is preferred.

DESCRIPTION OF THE PREFERRED EMBODIMENTS

A high purity aluminum oxide, type basic or neutral, having a mesh size of 48-100 (Tyler Standard Screen Scale) and preferably 60-80, is provided as the starting substance. Having particle sizes strictly within the 48-100 mesh limits is important and is obtained by a pneumatic separation process. In addition, high purity water is produced which is used in all subsequent liquid treatment steps. This water has been treated by a reverse osmosis process and further filtration by filters in accordance with the invention so that its impurities, if any, are virtually unmeasurable by existing analytical equipment in common use. Its lead content has been reduced to less than about one microgram per liter or, as used herein, one part per billion.

The starting aluminum oxide is then washed by the high purity water, which has been heated to 100° C. to reduce the alumina's alkalinity to a low pH surface value of about 3.5 to 5.0. When the appropriate low level of pH surface value is reached, the alumina is further washed with the highly purified water for several minutes. Although the pH surface values of 3.5 to 5.0 as used herein are considered accurate analyses of the actual pH values, a standard test wherein twenty grams of the alumina are stirred into a beaker having fifty milliliters of deionized water, which is then analyzed for pH, has consistently reflected higher pH levels by providing analyses of 4.0 to 6.5. Therefore, whenever pH surface values of about 3.5 to 5.0 are recited herein (values which are considered by the inventor to be accurate), it should be appreciated that these values may appear higher as a result of the particular type of analyses employed, which for example, may reflect 4.0 to 6.5 pH. These latter results should be considered equivalents which do not change the scope of the invention.

The alumina is next placed in a water tank or bath with hydrochloric acid or other electrolyte solution, wherein the ratio to water to concentrated hydrochloric acid is about 100 to 1. Here, the alumina is retained for three to twelve hours and then removed. The purpose of this step is to transfer to the adsorbent surface substances which will effect an ion exchange with lead and other heavy metals passing through the filter as ions or otherwise will selectively remove the lead from the water flowing through the cartridge. To achieve this, the pH value of the diluted hydrochloric acid or other electrolyte solution should be about the same as the pH surface value of the alumina being treated. This pH value can be reached by the adding, as appropriate, other materials to the solution which makes up the bath. For example, when ascorbic acid is being used, NaCl, and a small amount of NaOH can be added to adjust the pH level. Although in all cases the acid is highly diluted, the dilutions are not always 100 to 1. For the most favorable results, testing is required to determine the best mix of constituents and dilution. This is accomplished by conducting kinetic ion analyses which provide analyses of the lead ion transfer to the adsorbent surface. In general, materials should be used which will not add unacceptable toxicitity to the drinking water. With this limitation, other acids and salts containing different halogens, for example, may be employed. The important object is to provide on the adsorbent surface substances which will remove lead ions and those of other heavy metals commencing immediately as water flows through the cartridge and continuing to do so for a reasonable period of time such as one year without, at the same time, adding to the toxicitity of the drinking water.

Next, the alumina is washed in a vacuum system with distilled filtered water and, thereafter, the alumina is dried in an oven at a temperature of about 200° C. and, in any event, not above 350° C. for approximately two hours until 98% of the water has been removed.

Finally, the alumina is tightly packed in wet condition under pressure (100-200 psi) or by vibration into filter cartridges which are elongated cylinders of different sizes that, in practice, range from about two inches in diameter and ten inches in length, to four inches in diameter and twelve inches in length. Plumbing connections at opposite ends for $\frac{1}{4}$ inch up to $1\frac{1}{2}$ inch pipe sizes are provided. The filters are designed to reduce lead levels in water from 350 parts per billion to 5 or less parts per billion, at 100%-90% efficiency for a period in excess of one year.

Preferably the starting material is a mixed blend of high purity alumina, basic and aluminum oxide neutral. The pH of the filtration media is reduced to 3.5 to 5 and impurities are removed by the steps recited above. A crystalline structure, having a physio-chemical effective surface and pore texture results wherein in combination with the particle size and the tightly packed nature of the media in the filtration units provides very sensitive filtration of lead and other heavy metals for drinking water at the point-of-use. The media is capable of removing dissolved lead in drinking water so that a reduction of approximately 350 parts per billion to 1 part per billion occurs in one pass. By creating a low pH value, lead ions are attracted to the alumina's adsorbent surface, irrespective of expected pH levels of the water that is being filtered, assuming that it is in a pH range of 6.5 to 10 as normally found in drinking water.

In contrast, alumina that has not been purified or treated by a process, such as exemplified by the instant invention, removes lead only at fifty percent efficiency. This is considered to be due primarily to such alumina's alkali and unstable adsorbent surface. Aluminum oxide which has not been purified generally has a surface pH value of 10 to 14 and this, in turn, causes the pH in the water being filtered to become unstable due to its high alkalinity and high soda content. The filtration media is highly selective to lead and other heavy metals, and its filtration performance is unaffected by other anions which may be present in the drinking water such as calcium, magnesium, nitrates and other chemicals. Accordingly, not only lead, but also copper, zinc and other heavy metals are continuously and simultaneously removed from the drinking water.

The alumina used in the invention is safe to the extent that it will not leach more than 50 parts per billion of alumina in the most adverse water conditions wherein there is a very low pH level.

Filters constructed in accordance with the invention have efficiently reduced lead in drinking water in a wide range of temperatures (34°-120° F.) without the efficiency of the lead removal or the water flow being adversely affected.

The rate at which lead is removed is dependent on the contact time of the water containing the lead with the media.

The inventor has found that some lead formation in water appears as a result of radon gas in water in an unstable form. Units in accordance with the invention remove lead efficiently even in the presence of radon.

Evaluations of the invention using EPA Method 239.2 and also in NSF Standard 53, have confirmed that lead is consistently removed from drinking water at point-of-use by the invention to levels at about or below 5 parts per billion.

The same process has been used by the inventor or, in theory, may be used to prepare other adsorbents as filtration media such as activated carbon, silica gel, magnesium dioxide and various zeolites. In tests conducted with adsorbents other than alumina wherein, in particular, the adsorbent surfaces were treated as taught by the instant invention, roughly the same level of removal of lead and other heavy metals resulted except that the lifetime of such filters proved to be substantially less. For example, a filter of activated carbon prepared in accordance with the invention had a lifetime which is only about twenty percent of that obtained in using gamma alumina.

The cartridges are loaded with approximately 200 to 1000 grams of alumina according to the desired flow rate through the cartridge which, at point-of-use, is typically from one-half to three gallons per minute with a reduction in line pressure of not more than 10 pounds per square inch when a flow rate through the cartridge is at the rate of capacity. Thus, there may be a reduction of the flow rate from say, 40 pounds per square inch to 30 pounds per square inch, in a typical home or office.

There are two types of packing used with the invention. One is an extrusion method against a pressure of about 200 pounds per square inch which is used for wet packing wherein only about 50% of the moisture has been removed in the drying process. The pressure, which should be at least 100 pounds per square inch and preferably 200 pounds per square inch in this process of loading the cartridges should, in any event, be sufficient to prevent the formation of channels through the filtration media whereby much of the media will not be bypassed by the water flow and, at the same time, not so much pressure as to cause a blockage. As indicated above, the desired pressure reduction of water flowing through the cartridge at capacity is about 10 pounds per square inch.

Another packing method is used wherein about 98% of the moisture has been removed from the alumina in the drying process which is termed a dry pack and is accomplished by vibrating the cartridge at a rate of 3900 vibrations per second. The result is a densely packed cartridge wherein channelling of the water through the cartridge does not occur and, again, the pressure reduction caused by the cartridge is not greater than about 10 pounds per square inch. Equipment for the vibration is obtained from Alpine Pneumatics.

When the alumina filter, in accordance with the invention, is utilized with a filter wherein the filtration agent consists of brass shavings which is installed in the water flow prior to the alumina filtration material, the alumina acts to remove the byproduct of the dechlorination media. The zinc-copper alloy filtration media produces an oxidation reaction, whereby chlorine is converted to zinc chloride, which the alumina filter effectively removes. Drinking water which contained 3 ppm chlorine, when passed through a zinc-Copper filtration media, produces at least 1 ppm of zinc chloride in the water that flows therefrom. The alumina, in accordance with the invention, then effectively removes about 99% or more of the zinc chloride. In practice, the content of copper in water which was leached from the brass filtration media was 1.2 ppm. For zinc, the content was 3.6 ppm. The alumina filter, in accordance with the invention, reduced both the zinc and copper content to 0.001 ppm. Such results were achieved in trials wherein the amount of the brass shaving media which was 49% copper and 51% zinc, was equal in weight to the alumina content in grams, 1000 grams each, water pressure to the filter was about 60 psi, and the flow was one gallon per minute. Outlet pressure was about 55 psi, chlorine content of water entering was 3 ppm, leaving less than 0.1 ppm. By placing the alumina in accordance with the invention after the brass filtration media, a further problem is solved with beverage dispensing machines that use municipal water wherein carbon dioxide which the machine introduces into the water may accidentally backwash. In such a case, the brass filtration media is protected by the alumina, and therefore it does not suffer the damage which would otherwise occur from the carbon dioxide reaction with the brass filtration agent.

Although the two filtration medias, the alumina, and the brass, were of the same weight, and the combination was in compliance with NSF and EPA standards (which the brass filtration agent, per se, was not), preferably, the amount of brass media should be between one-third and two-thirds of that of the alumina by weight. The shavings of the brass media are tightly packed to increase the contact of the water flowing therethrough, while, at the same time, are not so tightly packed they will unduly restrict the water flow. In addition, the alumina is effective in removing other foreign matter, such as pirogins, which are not effectively removed by the brass filtration media.

The foregoing description has been given for clearness of understanding and unnecessary limitations should not be understood therefrom. Modifications and further details will be obvious to those skilled in the art.

Having disclosed my invention, what I claim as new and to be covered by Letters Patent of the United States is:

1. In a process for removing lead and other heavy metals and chlorines from drinking water at a desired treatment location, wherein the lead content of the drinking water is reduced to less than about 5 micrograms per liter, and the chlorine content is reduced to less than 0.1 ppm, filtering water containing lead and other heavy metals and chlorine through a filtration media comprising a zinc-copper alloy and gamma alumina having a surface pH in a range of approximately 3.5 to 5.0.

2. A process in accordance with claim 1, wherein 200 to 1,000 grams of zinc-copper alloy, and 200 to 1,000 grams of gamma alumina are used with corresponding maximum water flow rates of approximately one-half to three gallons per minute.

3. A process in accordance with claim 1, wherein the zinc-copper alloy comprises shavings.

4. A process in accordance with claim 3, wherein said zinc-copper alloy is about 50% zinc and 50% copper by weight.

5. A process in accordance with claim 4, wherein the ratio by weight of the alumina to the zinc-copper alloy is one to between 0.3 and 0.7.

6. A process in accordance with claim 1, wherein the quantity of copper in said alloy is, by weight, greater than the quantity of said zinc in said alloy.

7. A process in accordance with claim 6, wherein said alloy is a brass alloy.

8. A process in accordance with claim 1, wherein said chlorine is present in said drinking water prior to filtration as hypochlorous acid or salts thereof.

* * * * *